Figure 1:
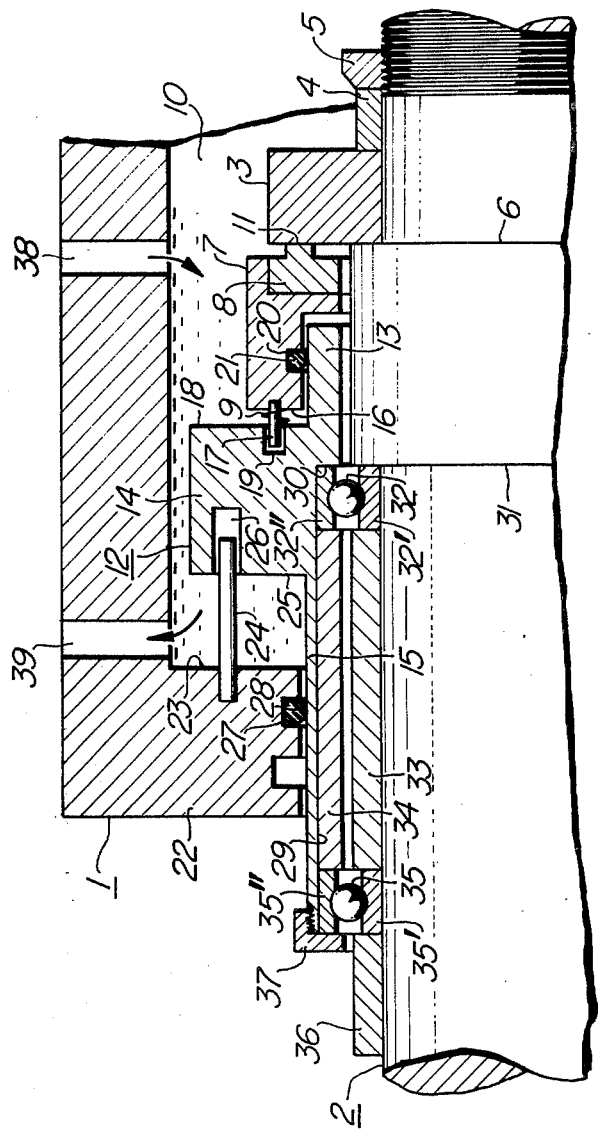

United States Patent [19]

Imai et al.

[11] 4,145,059
[45] Mar. 20, 1979

[54] MECHANICAL SEAL

[75] Inventors: Masaya Imai, Ibaraki; Seiji Watanabe, Hitachi, both of Japan

[73] Assignee: Hitachi, Ltd., Japan

[21] Appl. No.: 745,060

[22] Filed: Nov. 26, 1976

[51] Int. Cl.² .............................................. F16J 15/34
[52] U.S. Cl. .................................................. 277/81 R
[58] Field of Search .................................. 277/81–95, 277/136

[56] References Cited

U.S. PATENT DOCUMENTS

| | | | |
|---|---|---|---|
| 3,070,378 | 12/1962 | Bojako et al. | 277/83 |
| 3,540,742 | 11/1970 | Tracy | 277/136 |
| 3,921,986 | 11/1975 | Geary et al. | 277/83 |
| 3,972,536 | 8/1976 | Warner et al. | 277/83 |

*Primary Examiner*—Robert I. Smith
*Attorney, Agent, or Firm*—Craig & Antonelli

[57] ABSTRACT

A mechanical seal comprises, in addition to a rotating seal element, a stationary seal element, and a support ring: means for securing the support ring to a rotating shaft in such a manner that, between a casing and the shaft, the ring remains nonrotatable by the shaft but can travel axially following any axial movement of the shaft. The securing means comprises nonrotational stop means located between the casing and support ring and means located between the ring and shaft to permit the both to rotate relative to each other but keep them from moving axially. The nonrotational stop means is a combination of pins and holes, key ways and keys, or the like, and the means located between the ring and shaft to permit the both to rotate is either a pair of rolling bearings or a plurality of journal bearings plus a thrust sliding bearing.

1 Claim, 2 Drawing Figures

MECHANICAL SEAL

This invention relates to a mechanical seal to be used as a shaft seal for large rotary machines whose rotating shafts tend to stretch appreciably in the axial direction due principally to thermal expansion while in operation.

On such big machines as AC generators, for example, axial elongative movements of their rotating shafts over distances of as much as about 30 mm can result from the thermal expansion.

Conventionally those rotating machines use mechanical seals of the so-called stationary types or rotary types as their shaft seal means. The seals typically comprise a rotating seal element carried by a rotating shaft, a stationary seal element, a support ring holding the stationary element in place, a casing to which the support ring is attached, and springs and nonrotational stop pins disposed between the stationary seal element and support ring. The construction makes it impossible for the stationary seal element to follow the movement of the rotating seal element when the rotating shaft has appreciably elongated axially due to thermal expansion, for example. With consequent increases in leakage of fluids the seals often fail to function properly any longer.

In view of the above, this invention has for its object the provision of a mechanical seal capable of maintaining the sealing function by adequately keeping up with any axial movement of the rotating shaft in operation.

According to the invention, a mechanical seal is provided which is characterized in that a rotating seal element is mounted on, for rotation with, a rotating shaft which may thermally expand and contract, a stationary seal element adapted to contact the rotating seal element to form sliding seal faces in between is loosely fitted on a support ring so as to slide only in the axial direction, and the support ring is mounted on the rotating shaft and between the shaft and a casing in such a manner that the ring is not rotatable together with the shaft but can move axially following an axial movement of the shaft.

The present invention will be better understood from the following description when taken in conjunction with the accompanying drawings showing preferred embodiments of the mechanical seal of the invention.

Figure 2:
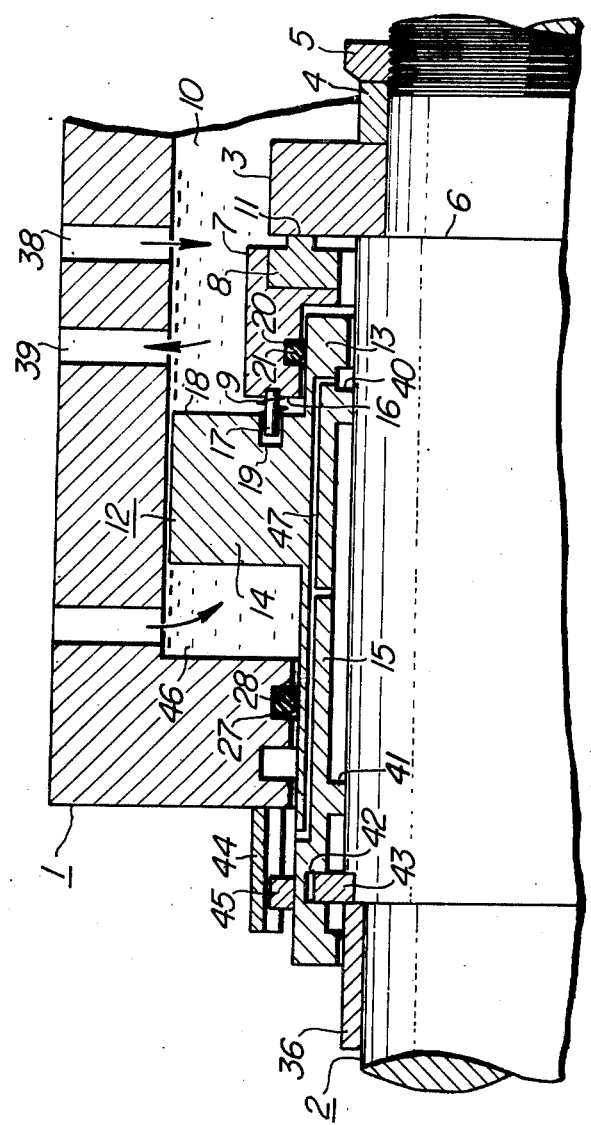

In the drawings:

FIG. 1 is a vertical sectional view of a half of a mechanical seal embodying the invention; and FIG. 2 is a view similar to FIG. 1 but showing another embodiment of the invention.

Referring to FIG. 1, a casing 1 is shown as surrounding a rotating shaft 2, with a rotating seal element 3 fixedly mounted on the shaft for rotation therewith, as pressed against a shoulder 6 on the shaft by a spacer 4 and a nut 5 engaged with a threaded shaft portion. A seal ring 8 of a stationary seal element 7 is urged to bear against the rotating seal element 3 by springs 9 to provide sliding seal faces 11 that seal a fluid in a seal chamber 10 defined between the casing 1 and rotating shaft 2. As will be described in detail later, the stationary seal element 7 is carried by a support ring 12 which is mounted on the rotating shaft 2 to move axially therewith but is kept by the casing 1 from rotating together with the shaft. The support ring 12 is a sleevelike member fitting over the shaft 2 and consists of an inwardly extending small-diameter portion 13, an intermediate large-diameter portion 14, and an outwardly extending small-diameter portion 15. On the inwardly extending small-diameter portion 13 rests the stationary seal element 7 in such a way as to slide only axially thereover as will be described below. A plurality of nonrotational stop pins 17 are set in the end 16 opposite to the slidable sealing face of the stationary seal element, at appreciate intervals in a circle centered on the axis of the rotating shaft. The free ends of the stop pins 17 are fitted in a plurality of corresponding holes 19 formed at an end 18 of the large-diameter portion 14 of the support ring facing the end 16 of the stationary seal element. The aforementioned springs 9 are equally spaced apart in a circle between the both end faces 16, 18. In an annular groove 20 formed on the inner peripheral surface of the stationary seal element 7 is fitted a sealing device, for example, an O ring 21 to provide a liquidtight seal between that inner peripheral surface and the outer peripheral surface of the inwardly extending small-diameter portion 13 of the support ring. A plurality of nonrotational stop pins 24 are set at regular intervals in a circle in the inside surface 23 of an end wall 22 of the casing 1. The free ends of the stop pins reach into a plurality of corresponding holes 26 formed at the end 25 of the large-diameter portion 14 of the support ring that is opposed to the inside face 23. On the inner peripheral surface of the casing end wall 22 is formed an annular groove 27, which receives a sealing device, for example, an O ring 28, to provide a liquidtight seal between that inner peripheral surface and the outer peripheral surface of the outwardly extending small-diameter portion 15 of the support ring. A recess 29 is annularly formed on the inner peripheral surface of the support ring 12, and there are disposed a rolling bearing 32, concentric inner and outer spacers 33, 34, and a rolling bearing 35, in the order mentioned from the left to right as viewed in FIG. 1, between the recess 29 and the stepped shaft portion starting from a shoulder 31 of the rotating shaft 2 that is on the same plane as a shoulder 30 of the recess. The inner race 32' of the rolling bearing 32, the inner spacer 33, and the inner race 35' of the rolling bearing 35 are fixedly mounted on the rotating shaft 2 by suitable means, with the inner race 32' pressed against the shoulder 31 by an end retaining ring 36 fitted over the shaft, adjacent the opposite end of the train. The outer race 32" of the rolling bearing 32, the outer spacer 34, and the outer race 35" of the rolling bearing 35 are secured in the recess 29 of the support ring by a nut 37 threadedly engaged with the outer end of the outwardly extending small-diameter portion of the support ring, with the outer race 32" bearing against the shoulder 30. It will be appreciated that, although the support ring 12 is kept stationary while the rotating shaft 2 runs with the aid of the both bearings, it can move together with the shaft in its axial movement. The support ring 12 remains stationary relative to the rotating shaft 2 because of the stop pins 24 extended from the casing 1 and engaged with the mating holes 26 of the support ring. Similarly, the stationary seal element 7 fitted over the support ring is kept from revolving with respect to the support ring by the action of the stop pins 17 engaged with the holes 19 of the support ring. Thus, the seal element 7 provides a static seal as it is nonrotatably engaged with the casing 1 by means of the stop pins 17, 24.

In order to equalize the axial forces to be generated by the pressure of a flushing fluid in the seal chamber 10 and thereby to protect the rolling bearings 32, 35 from excessive loads, the support ring 12 is preferably made so that the both ends 25, 18 of its large-diameter portion 14 have equal surface areas. More preferably, the surface areas of the both ends may be chosen so that the support ring 12 is axially urged and lightly pressed to the right by the flushing fluid pressure so as to reduce the axial plays of the rolling bearings 32, 35 and hold the seal ring 8 of the stationary seal element with added pressure against the rotating seal element 3. In the figure, 38 is an inlet passage for a cooling fluid to be used in flushing the sliding seal faces 11, and 39 is an outlet passage through which the fluid is discharged.

The operation of this mechanical seal will now be explained.

If the rotating shaft 2 is moved considerably to the right by some reason, for example, by thermal expansion, from the normally sealed state shown, the support ring 12 of the stationary seal element 7 and the rotating seal element 3, both mounted on the shaft 2, will move axially with the shaft. Thus, the basic seal components, i.e., the support ring 12, stationary seal element 7, and rotating seal element 3, in an integral assembly will follow the axial movement of the rotating shaft 2. Therefore, no change will take place in the pressure with which the seal ring 8 of the stationary seal element and the rotating seal element 3 are kept in contact, and the rotating shaft 2 will at all times be in an optimumly sealed state by the mechanical seal that freely follows any axial movement of the shaft.

FIG. 2 shows another embodiment of the invention, in which reference numerals like those used in FIG. 1 designate like or corresponding parts. In this embodiment the support ring 12 holding the stationary seal element 7 is mounted on the rotating shaft 2 with journal bearings 40, 41 provided on the inner peripheral surface of the support ring 12 and a thrust sliding bearing 43 secured to the shaft and fitted in an annular groove 42 formed also on the inner peripheral surface of the support ring. The support ring 12 is kept from revolving over the shaft, for example, by a plurality of key way members 44 attached at some intervals in a circle to the casing 1 and engaged with a corresponding number of keys 45 secured to the outer peripheral surface of the outwardly extending small-diameter portion 15 of the support ring 12. While the above description refers to the use of key-and-key way combinations as nonrotational stop means for the support ring 12, it will be appreciated that other suitable means may be used for this purpose. The second embodiment further includes a pressure chamber 46 which, with a fluid pressure therein kept slightly higher than in the seal chamber 10, gives an added force to press the seal ring 8 of the stationary seal element 7 against the rotational seal element 3, and also minimizes the objectionable play between the annular groove 42 and the thrust sliding bearing 43. The pressure in the pressure chamber 46 can be regulated by an outside pressure source to give axial thrust to the support ring 12, when the support ring 12 is accidentally stuck and its axial movement is prevented. A drain passage is indicated at 47. In this embodiment of the invention, the support ring 12 can be guided by the inner wall of the casing 1, and the journal bearings may be omitted.

This embodiment can follows any appreciable axial movement of the rotating shaft 2 and maintain an optimum sealing function at all times as satisfactorily as the first embodiment described in connection with FIG. 1.

As has been described in detail, the mechanical seal according to the invention is built so that the support ring of a stationary seal element, which makes contact with a rotating seal element to provide sliding seal faces, is mounted on a rotating shaft to remain unrotated by the shaft but move axially therewith, thus permitting the seal elements to follow the axial movement of the shaft. With the construction in accordance with the invention, the decrease in sealing capacity that ordinary mechanical seals often undergo due to axial movements of the rotating shafts can be prevented without employing rather large corrective means. The mechanical seal of the invention is, therefore, best suited as shaft seal means for the rotary machines whose rotating shafts tend to expand and move axially to appreciable extents.

What is claimed is:

1. In a mechanical seal including a rotating seal element mounted on a rotating shaft in a casing for rotation therewith, a stationary seal element provided with a seal ring which is in contact with said rotating seal element and providing sliding seal faces in between, and a support ring supporting said stationary seal element thereon, allowing the latter to move only in the axial direction, the improvement comprising means for securing said support ring to said rotating shaft in such a manner that, between said casing and said shaft, said ring is not rotatable by said shaft, but can travel axially following any axial movement of said shaft, and wherein said support ring is provided with an intermediate large diameter portion having a diameter slightly smaller than that of the inner axial surface of the casing, said means for securing said support ring to said rotating shaft in the manner set forth comprising nonrotational stop means located between said casing and support ring, said inner axial surface slidably guiding said large diameter portion of the support ring and a thrust sliding bearing mounted on said rotating shaft and fitted in an annular groove formed on the inner peripheral surface of said support ring.

* * * * *